United States Patent [19]
Jheeta

[11] Patent Number: 5,619,558
[45] Date of Patent: Apr. 8, 1997

[54] ATM SEGMENT OF ONE MARKETING METHOD

[75] Inventor: Elizabeth A. Jheeta, West Carrollton, Ohio

[73] Assignee: NCR Corporation, Dayton, Ohio

[21] Appl. No.: 557,866

[22] Filed: Nov. 13, 1995

[51] Int. Cl.⁶ .................................................. H04M 11/00
[52] U.S. Cl. .................................. 379/90; 235/379; 902/24
[58] Field of Search ............................ 379/90; 235/379; 902/24

[56] References Cited

U.S. PATENT DOCUMENTS 5,220,501  6/1993  Lawlor et al. ............................ 379/90

*Primary Examiner*—Harold Pitts

[57] ABSTRACT

A method for segment of one marketing to a customer utilizes an automated teller machine (ATM). The ATM dispenses to the customer a receipt containing a transaction record, a promotion, and a telephone number for redeeming the promotion by the customer. When the customer calls the telephone number, a telephonic survey is conducted and includes questions relating to products and services offered by a marketeer. Answers to the survey questions are stored in a customer profile in a computer database, and the promotion is sent to the customer. The customer profile is used to generate a segment of one target message specific to the customer which offers a specific product or service from the marketeer based on the stored customer profile. The target message is then sent to the specific customer to complete the segment of one marketing.

13 Claims, 3 Drawing Sheets

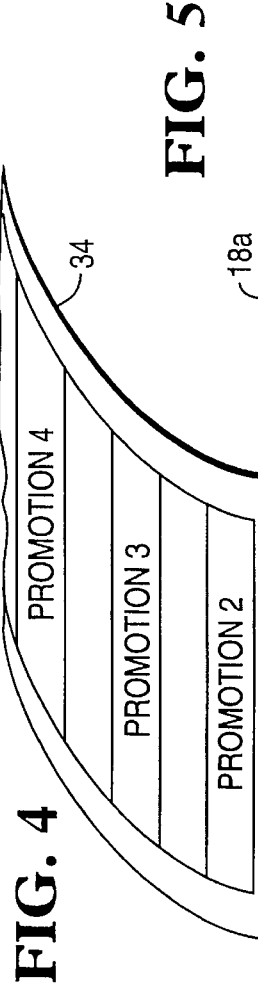

ATM SEGMENT OF ONE MARKETING METHOD

BACKGROUND OF THE INVENTION

The present invention relates generally to automated teller machines, and, more specifically, to using automated teller machines for segment of one marketing.

Banks face an increasing challenge in gaining and retaining customers with competition from non-bank services heating up and the market remaining saturated with a large number of banks. The goal of financial institutions centers on increasing the array of financial products sold to a consumer. Reaching or gaining a customer's interest to achieve this goal becomes an even greater challenge since a majority of bank customers rarely enter a bank, but instead use an automated teller machine (ATM).

However, there remains a substantial opportunity for banks to increase the array of financial products sold to customers through cross-selling activities. A typical bank offers a substantial number of financial products to the average household customer, with each customer typically using only one or two of the products. By increasing the number of products sold to the customer, a bank has a greater chance of retaining that customer.

A bank has limited opportunities in reaching existing or potential customers. Advertising flyers promoting bank products is one method. Telephone banking is another method wherein recorded messages may be used to promote the products. A customer may also be informed of various bank products upon opening of an initial account with the bank. Since a significant number of customers now use ATMs for conducting their banking services, the ATM offers yet another method for reaching customers and fulfilling the goal of enabling banks to better target new and existing customers and increase the array of financial products sold to a customer. Cross-selling and increasing product penetration is a desired objective of financial institutions which may be effected using ATMs.

SUMMARY OF THE INVENTION

A method for segment of one marketing to a customer utilizes an automated teller machine (ATM). The ATM dispenses to the customer a receipt containing a transaction record, a promotion, and a telephone number for redeeming the promotion by the customer. When the customer calls the telephone number, a telephonic survey is conducted and includes questions relating to products and services offered by a marketeer. Answers to the survey questions are stored in a customer profile in a computer database, and the promotion is sent to the customer. The customer profile is used to generate a segment of one target message specific to the customer which offers a specific product or service from the marketeer based oil the stored customer profile. The target message is then sent to the specific customer to complete the segment of one marketing.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 3 is the front side of an exemplary ATM receipt showing a transaction record and a first part of a promotion.

FIG. 4 is the reverse side of the ATM receipt illustrated in FIG. 3 being dispensed from a row of receipts showing a second part of the promotion along with an additional marketing message.

FIG. 5 is the front side of a subsequent ATM receipt containing a transaction record, and a target message for a specific customer.

DESCRIPTION OF THE PREFERRED EMBODIMENTS

Figure 1:
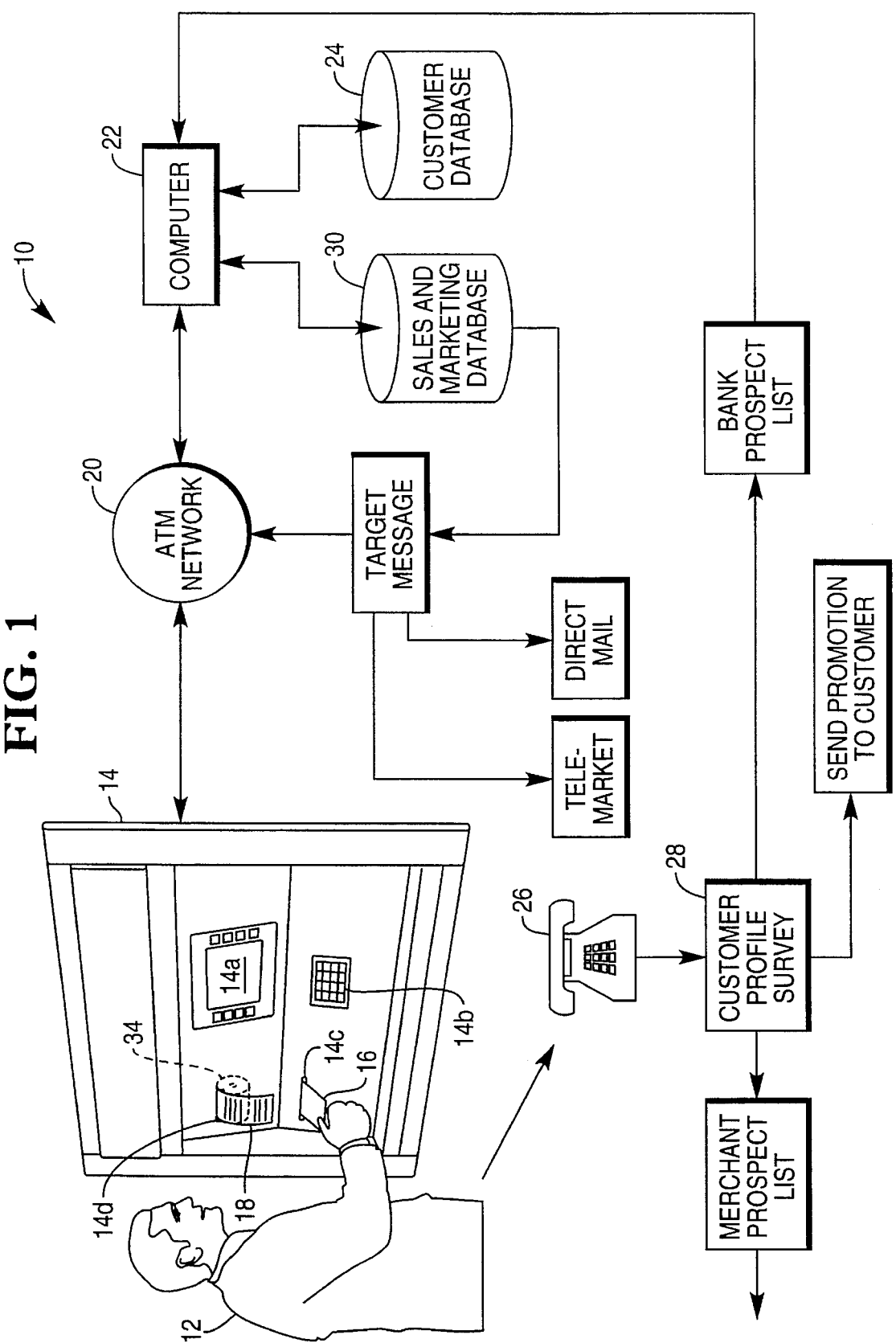
FIG. 1 is a schematic representation of an automated teller machine (ATM) network configured in accordance with one embodiment of the present invention for effecting segment of one marketing.

Illustrated schematically in FIG. 1 is an exemplary embodiment of a system 10 for effecting segment of one marketing to individual ones of a plurality of bank customers 12 utilizing any one of a plurality of conventional automated teller machines (ATMs) 14. Each ATM 14 conventionally includes a CRT display screen 14a, a key pad 14b, a card reader 14c for reading a conventional ATM card 16 inserted therein by the customer 12, and a receipt printer 14d which prints on demand for each customer transaction at the ATM 14 an ATM receipt 18.

The ATM 14 is one of many contained in a conventional ATM network 20 which is accessible by any one of the customers 12 at different geographic locations across a region such as individual states or the entire United States. The ATM network 20 is joined to various conventional digitally programmed computers 22 having various customer databases 24 operatively joined thereto. In conventional use, a customer 12 inserts the card 16 into one of the ATMs 14 to access the network 20 and to conduct authorized financial transactions. The authorized transactions are conventionally stored in the customer database 24 which contains customer identification information, the customer's personal identification number (PIN), and authorized financial transactions such as depositing and withdrawing money from one or more bank accounts for example. Upon completion of the transaction, the ATM 14 dispenses to the customer a corresponding receipt 18.

Figure 2:
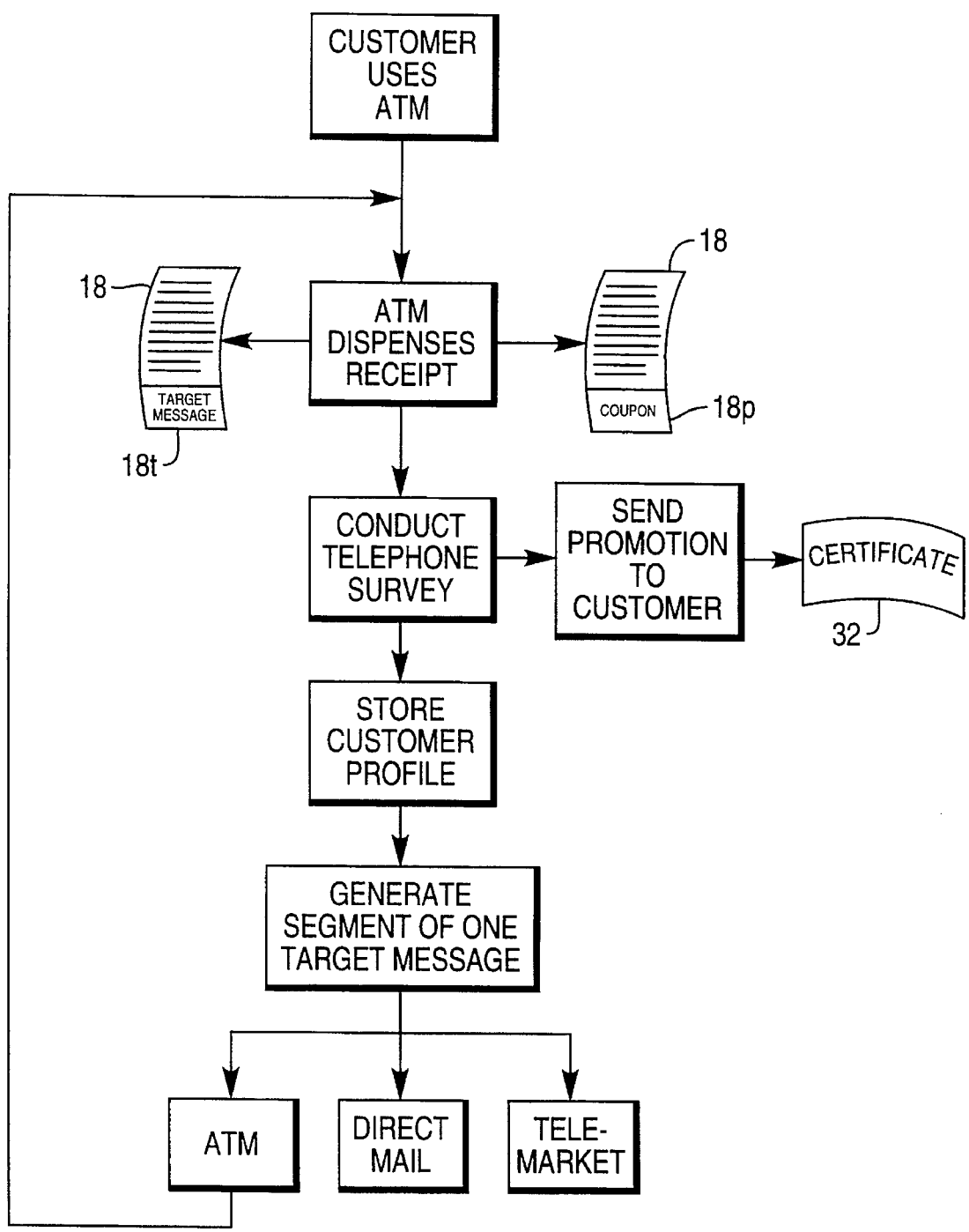
FIG. 2 is a flow chart representation of exemplary method steps for effecting the segment of one marketing using the ATM network illustrated in FIG. 1.

In accordance with one embodiment of the present invention, the system 10 is specifically configured for effecting segment of one marketing which targets individual customers 12 with a specific marketing promotion tailored for the individual customer 12. FIG. 2 is an exemplary flow chart representation of the segment of one marketing which may be carried out using the marketing system 10 illustrated in FIG. 1. The segment of one marketing is carried out in two phases, with the first phase being initiated when the customer uses one of the ATMs 14 in a conventional manner, with the ATM 14 dispensing a receipt 18 to the customer. The receipt 18 has a front side 18a illustrated in FIG. 3 in exemplary form, and a reverse side 18b illustrated in FIG. 4 in exemplary form. The reverse side 18b of a conventional receipt 18 is normally blank.

In accordance with the present invention, the receipt front side 18a includes in addition to a conventional transaction record 18c printed thereon, a suitable promotion 18p also printed thereon for attracting the attention of the customer.

The promotion 18p may take any suitable form such as a redeemable offer or coupon having some monetary or other value to the customer. The promotion 18p may offer a limited amount of free long distance telephone calling for example, which may be redeemed or received by the customer when the customer calls a preferably toll free telephone number also contained in the promotion 18p, on the reverse side of the receipt for example.

If the customer is interested in the specific promotion 18p, the customer may subsequently use a telephone 26 as shown in FIG. 1 to call a service center 28 responding to the dialed telephone number contained on the receipt. A suitable live or automated telephonic survey is conducted with the customer in response to the customer's call for redeeming the promotion. The customer survey includes a plurality of predetermined questions relating to products and services offered by a specific seller company or marketeer. The marketeer may be the customer's own bank with which the financial transaction was conducted using the ATM, or may alternatively or in conjunction be a second company or merchant in addition to the bank.

Since a major objective of the present invention is to market customers for cross-selling financial products and services of a bank, the survey questions are preferably specifically tailored to the products and services offered by the bank itself in an attempt to cross-sell additional products to the bank customer. The promotion 18p may offer any suitable incentive for attracting the customer's attention in responding to the survey. In the example of offering free long distance calling, the bank itself may pay for the offered free calls provided by any one of several long distance carriers. However, the long distance carrier itself may also desire to target ATM customers and therefore may pay the bank for including specific survey questions for promoting the carrier's offered products or services. Any merchant may find advantage in offering a promotion through the ATM receipts.

Exemplary telephonic survey questions may include:

1. Are you happy with your current banking services?

2. How could we be more convenient?

3. Are we your primary bank?

4. We are able to help you consolidate your various bank accounts. Is this something you would be interested in?

5. We are currently offering low interest installment loans. How can this be of service to you?

6. Would you be likely to purchase stamps through an ATM?

7. Would checking account statements offered through an ATM be of interest to you?

8. Would you like to buy sporting events or movie theater tickets through an ATM?

9. Who is your long distance telephone carrier?

10. What long distance telephone programs are you enrolled with?

11. Would you be interested in switching long distance telephone carriers?

The answers to the survey questions are suitably stored in a customer profile in a sales and marketing computer database 30 specifically configured therefor and operatively joined to the computer 22. In this way, information from the responding customers may be used to build the sales and marketing database 30. Where the survey questions are selected for providing feedback information for both the bank and a different merchant, the customer profile information is provided in two sets, one set being a bank prospect list of customers and survey answers which are stored in the marketing database 30, and the other set including a prospect list and survey answers for a specific merchant. As shown in FIGS. 1 and 2, once the customer has answered the survey questions, the service center 28 will send to the customer the promotion in the exemplary form of a suitable certificate 32 which may then be used for redeeming the offered promotion. In the exemplary case of free long distance calling, the certificate 32 may be redeemed by the customer by returning it to the offering long distance carrier which provides the free long distance calling in exchange for the certificate.

Accordingly, phase one of the segment of one marketing method effectively utilizes conventional ATMs 14 to offer the promotion 18p to individual customers for their consideration, resulting in the generation of customer profile surveys for responding customers. In addition to the promotion 18p contained on the receipt 18, the receipt may further include an additional promotion 18d promoting one of the bank's offered products. FIG. 4 illustrates for example that the additional promotion 18d may relate to a mortgage loan which the customer may be interested in.

As indicated above, the ATM receipt 18 has front and reverse sides 18a,b, with the transaction record 18c being conventionally printed on the front side 18a. The ATM receipt printer 14d is a demand printer which promptly prints a corresponding receipt for the specific transaction conducted by the customer. Since the receipt 18 has limited area, the promotion 18p is preferably broken up into two parts with a first part being printed on the receipt front side 18a, and a second part being printed on the receipt reverse side 18b. The first part of the promotion is a suitable attention getting notice such as the word "coupon" or other suitable statement, with the promotion second part being a further description of the promotion itself, including the preferably toll free telephone number for use by the customer in redeeming the promotion. Since the ATM receipt printer 14d is a demand printer, the notice part of the promotion may also be printed on the receipt front side 18a at the same time the transaction record 18c is printed. Or, if desired, the promotion notice on the receipt front side 18a may be preprinted. In order to avoid changing the ATM 14 itself, the second part of the promotion 18p contained on the receipt reverse side 18b is preferably preprinted outside of the ATM 14 since it will typically contain generic and not specifically targeted promotional information intended to be of interest to a great number of customers.

As shown in FIG. 1, ATM receipts are initially provided in a suitable roll 34 of blank receipts which are suitably mounted in the ATM 14. Individual rolls 34 may be suitably preprinted to contain repetitive information and any desired ornamental designs on the receipts which do not change between customers. In phase one of the method, the bank determines the number of different marketing messages and frequency in which they dispense from the ATM 14. One or more of the promotions 18p and 18d may change as desired in any individual roll 34 of ATM receipts.

FIG. 4 illustrates a portion of an exemplary roll 34 which contains a plurality of different promotions preprinted on the receipt reverse side 18b. Either of the redeemable promotion 18p or the additional promotion 18d may be changed as desired. For example, the bank itself may want to market different financial products depending upon the present level of usage thereof for example. The bank may desire to increase their loan portfolio or increase the number of certificates of deposit (CDs), and therefore may use the additional promotions 18d for this objective. Accordingly, each receipt roll 34 may contain different promotions for mortgage loans or CDs for example, with the number and frequency thereof being preselected as desired for individual rolls 34.

Accordingly, in phase one of the marketing method, the bank itself may market its various financial products through the additional promotion 18d contained on the receipt reverse side 18b, using the redeemable promotion 18p to attract attention.

In phase two of the marketing method, the specific customer profile surveys may then be used for targeting individual customers and providing a target message therefor. As shown in FIG. 1, the sales and marketing database 30 is used to determine additional products which may be of interest to a specific customer. This may be done in any conventional fashion by marketing personnel which examine the customer profiles and in turn specify the required target message for the specific customers. The specific target messages are then stored in the database 30 for subsequent delivery to the customers.

The specific customer profiles obtained from the telephone survey allows a segment of one target message specific to the customer to be generated to offer a specific product or service from the marketeer, such as the bank, based on the stored customer profile. The target message is then suitably sent to the customer to complete the segment of one marketing. In its simplest form, the target message may be printed in a suitable letter or brochure and mailed to the customer using conventional direct mail marketing. Or, the target message may be communicated to the customer using conventional tele-marketing.

In a preferred embodiment of the present invention, the target message is printed by the receipt printer 14d illustrated in FIG. 1 upon a subsequent access to one of the ATMs 14 by the specific customer. FIG. 5 illustrates an exemplary ATM receipt 18 containing an exemplary target message 18t in addition to the transaction record 18c on the front side 18a thereof. The ATM receipt printer 14d may print on demand with the transaction record 18c a brief target message 18t based on the results of the specific survey conducted with the corresponding customer. The target message 18t may be readily printed on the receipt front side 18a without additional modification of the ATM 14 itself. Since the ATM 14 recognizes the identity of the specific customer accessing the ATM, the target message 18t is preferably personalized with the customer's name and some suitable message prepared in response to the survey. For example, the survey might indicate that one of the customer's children is graduating from high school and will be attending college. Therefore a message concerning available student loans may be directed to the customer.

Accordingly, phases one and two of the marketing system and method disclosed above allow true segment of one marketing specific to individual customers based on the results of the individual customer surveys. It may be used to advantage by financial institutions such as banks which are the primary providers of ATM services to target and message individual customers for promoting cross-selling of financial products offered by the bank. Segment of one marketing may also be used to provide feedback to additional marketeers such as merchants who may provide the redeemable promotion 18p itself for their separate use in targeting ATM customers. ATM target messages 18t may be prepared for either the bank itself or any other marketeer or merchant as desired for more fully utilizing the potential marketing capabilities of the substantial number of ATMs 14 which exist worldwide.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A method for segment of one marketing to one of a plurality of customers utilizing one of a plurality of automated teller machines (ATMs) comprising:

dispensing to a customer from an ATM a receipt containing a transaction record, a promotion, and a telephone number for said customer to call for redeeming said promotion;

conducting a telephonic survey with said customer upon calling by said customer of said telephone number in response to said promotion, said survey including a plurality of questions relating to products and services offered by a marketeer;

storing answers to said survey questions in a profile for said customer in a computer database therefor;

sending said promotion to said customer;

generating a segment of one target message specific to said customer to offer a specific product or service from said marketeer based on said stored customer profile; and sending said target message to said customer.

2. A method according to claim 1 wherein said ATM receipt has front and reverse sides, and said transaction record is printed on said receipt front side, and said promotion has two parts printed on respective sides of said receipt.

3. A method according to claim 2 wherein said promotion first part is a notice; and said promotion second part includes said telephone number and a description of said promotion.

4. A method according to claim 3 further comprising:

printing said promotion first part in said ATM upon printing said transaction record; and preprinting said promotion second part outside said ATM.

5. A method according to claim 4 further comprising providing a roll of blank ATM receipts in said ATM, with said roll including a plurality of different promotions preprinted on said receipt reverse sides.

6. A method according to claim 3 wherein:

said ATM is a bank ATM;

said ATM receipt is for a bank transaction; and said marketeer is said bank, with said survey questions relating to cross-products and services offered by said bank.

7. A method according to claim 6 wherein said marketeer includes a second company in addition to said bank, and said survey questions relate to products and services offered by both said two companies; and further comprising providing a customer prospect list to said second company containing a list of ATM customers responding to said survey and providing answers to said questions indicative of a possible need of said products and services from said second company.

8. A method according to claim 7 wherein said promotion is offered by said second company.

9. A method according to claim 8 wherein said receipt reverse side further includes an additional promotion for said bank.

10. A method according to claim 3 further comprising mailing said target message to said customer.

11. A method according to claim 3 further comprising tele-marketing said target message to said customer.

12. A method according to claim 3 further comprising printing said target message in one of said ATMs upon a subsequent use thereof by said customer.

13. A method according to claim 12 wherein said target message is printed on said receipt front side.

\* \* \* \* \*